US007389086B2

United States Patent
Toda et al.

(10) Patent No.: US 7,389,086 B2
(45) Date of Patent: Jun. 17, 2008

(54) ADAPTIVE ARRAY ANTENNA CONTROLLER

(75) Inventors: Takeshi Toda, Kawasaki (JP); Yuuta Nakaya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 870 days.

(21) Appl. No.: 10/746,696

(22) Filed: Dec. 24, 2003

(65) Prior Publication Data

US 2004/0140929 A1 Jul. 22, 2004

(30) Foreign Application Priority Data

Dec. 27, 2002 (JP) .............................. 2002-380640

(51) Int. Cl.
*H04B 7/185* (2006.01)
*H04B 1/00* (2006.01)

(52) U.S. Cl. .................. 455/13.3; 455/67.11; 455/63.1; 342/367

(58) Field of Classification Search ....... 455/63.1–63.4, 455/67.11, 13.3; 342/367
See application file for complete search history.

(56) References Cited

U.S. PATENT DOCUMENTS

| 5,566,209 | A  | * | 10/1996 | Forssen et al. ............... 375/262 |
| 6,327,314 | B1 | * | 12/2001 | Cimini et al. ............... 375/340 |
| 6,330,294 | B1 | * | 12/2001 | Ansbro et al. ............... 375/347 |
| 6,411,612 | B1 | * | 6/2002  | Halford et al. ............. 370/347 |
| 6,931,244 | B2 | * | 8/2005  | Kitakado et al. ......... 455/277.1 |
| 6,952,460 | B1 | * | 10/2005 | Van Wechel et al. ........ 375/350 |
| 2004/0246889 | A1 | * | 12/2004 | Ogawa et al. ............... 370/210 |

FOREIGN PATENT DOCUMENTS

| EP | 0892504 | 1/1999 |
| GB | 2365695 | * | 2/2002 |
| JP | 03-061108 | | 3/1991 |

OTHER PUBLICATIONS

Nishikawa, et al., "OFDM Adaptive Array for Doppler Shifted Wave Suppression" Technical Report of the Institute of Electronics, Information and Communications Engineers, RC2000-113, pp. 57-62 (2000).
Chow, et al., "Equalizer Training Algorithms for Multicarrier Modulation Systems" 1993 IEEE, pp. 761-765.
"Asymmetric Digital Subscriber Line (ADSL) Transceivers" ITU-T Recommendation, G992.1, (Jun. 1999) International Telecommunications Union.
European Search Report dated Dec. 17, 2004, for corresponding European Application EP 03 02 9667.

* cited by examiner

*Primary Examiner*—Yuwen Pan
(74) *Attorney, Agent, or Firm*—Katten Muchin Rosenman LLP

(57) ABSTRACT

An adaptive array antenna controller is disclosed that adaptively controls weighting coefficients of multiple antenna elements of an array antenna based on a digital signal outputted from an analog-to-digital converter receiving a weighted analog signal received from the array antenna. The controller includes an impulse response measuring device for obtaining impulse responses, based on correlation calculation of the digital signal and a known signal having a predetermined pattern; an impulse response generator for extracting path components existing within a predetermined time duration from among plural path components included in the impulse responses and generating desired impulse responses; a reference signal generator for forming a reference signal having a desired pattern, based on convolution calculation of the desired impulse responses and the known signal; and an adaptive controller for adjusting the weighting coefficients, based on the digital signal and the reference signal.

13 Claims, 7 Drawing Sheets

ADAPTIVE ARRAY ANTENNA CONTROLLER

BACKGROUND OF THE INVENTION

1. Field of the Invention

The present invention relates to an adaptive array antenna controller.

2. Description of the Related Art

Transmission signals in mobile communication system are transmitted in a multipath transmission environment. In order to demodulate received signals well, it is necessary to appropriately process a variety of signals coming through several transmission paths. With respect to this point, the OFDM (Orthogonal Frequency Division Multiplexing) method is a promising technology in this technical field. In this method, data are carried on a plurality of carriers that have orthogonal relations with each other, and received signals are Fourier transformed and demodulated to provide a fade-proof communication system. This method is provided with a certain length of guard interval at each symbol, and therefore some delay signals can be limited within the guard intervals so as not to disturb the orthogonal relationship.

Ideally, all the delay signals arriving after delays from the leading wave (the first incoming wave) should be limited within the guard intervals. However some delayed signals (some path components) arrive over the guard intervals depending on the communications environment. Such signals with large delays form interference disturbing the orthogonal relationship between sub-channels, and prevent the recovery of transmitted signals. Accordingly, it is necessary to suppress such delayed signals by using adaptive equalizing techniques or adaptive array antenna techniques.

Conventional technologies for suppressing undesired delayed signals are described in "OFDM Adaptive Array for suppressing Doppler Shift", Nishikawa, Yoshitaha Hara, Shinsuke Hara, The Institute of Electronics, Information and Communication Engineering, Technical Report A-P2000-90, October 2000; "Equalizer Training Algorithms for Multicarrier Modulation Systems" J. S. Chow, J. M. Cioffi, and J. A. C. Bingham, International Conference on Communications, pp. 761-765, 1993; and "Asymmetric Digital Subscriber Line", ITU-T Recommendation G. 992.1, 1999.

In these conventional technologies, each received and weighted signal from each of a plurality of antenna elements is converted into a digital signal, and each thus obtained digital signal is supplied to a digital processing part to adaptively adjust weighting coefficients of the antenna elements. In this method, plural digital signals each obtained from one of the adaptive array antenna elements are utilized and very accurate adaptive controlling is attained.

However, the conventional method needs to form a plurality of digital received signals based on the plurality of antenna elements. Therefore, a number of analog-to-digital converters corresponding to antenna elements are needed, the circuit is complex, and there are additional disadvantages regarding consumption of power, circuit size and cost, which are much more disadvantageous especially for small radios or mobile phones.

SUMMARY OF THE INVENTION

In view of the above, it is a general object of the present invention to provide an adaptive array antenna controller for suppressing delayed signal components (path components) arriving after a certain delay time from a leading wave, as interference components contained in received signals.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by the adaptive array antenna controller particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides an adaptive array antenna controller that adaptively controls weighting coefficients of a plurality of antenna elements of an array antenna based on a digital signal outputted from an analog-to-digital converter receiving a weighted analog signal received from the array antenna, comprising: an impulse response measuring device for obtaining impulse responses, based on correlation calculation of the digital signal and a known signal having a predetermined pattern; an impulse response generator for extracting path components existing within a predetermined time duration from among a plurality of path components included in the impulse responses and generating desired impulse responses; a reference signal generator for forming a reference signal having a desired pattern, based on convolution calculation of the desired impulse responses and the known signal; and an adaptive controller for adjusting the weighting coefficients, based on the digital signal and the reference signal.

DESCRIPTION OF THE PREFERRED EMBODIMENTS

In the following, embodiments of the present invention are described with reference to the accompanying drawings.

Figure 1:
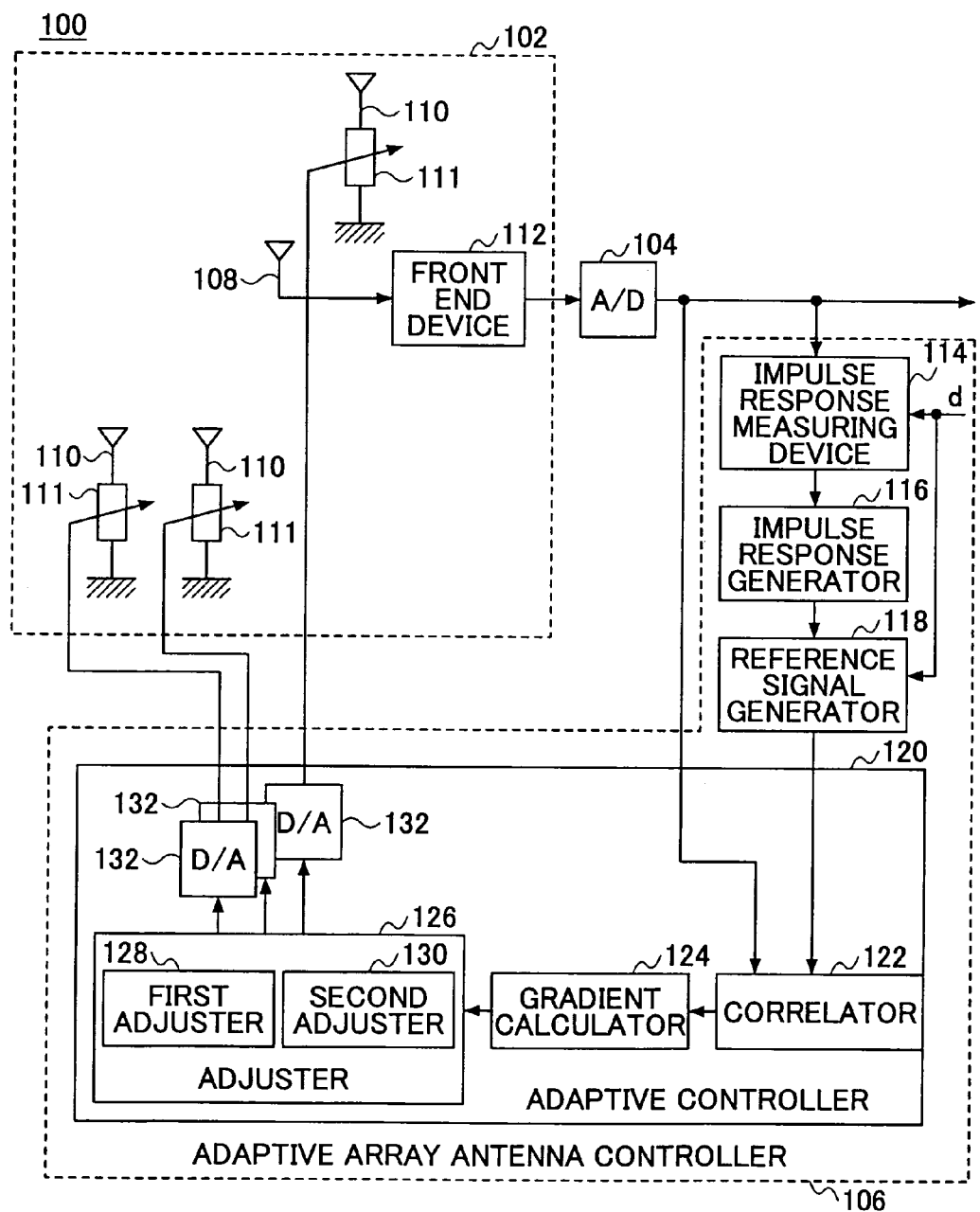
FIG. 1 shows a block diagram of an adaptive array antenna system according to an embodiment of the present invention.
Figure 2:
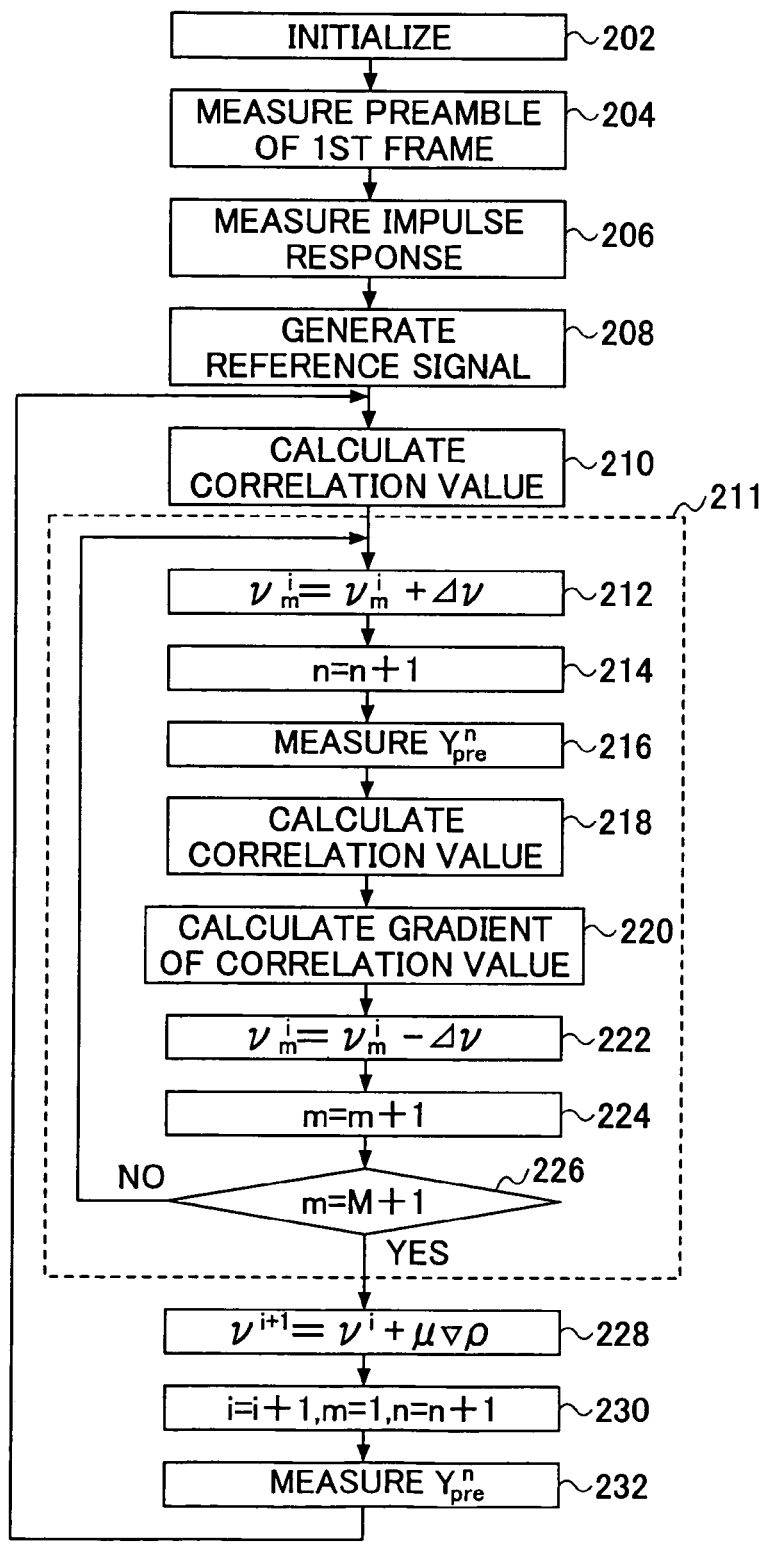
FIG. 2 shows a flow chart illustrating a control operation performed in the adaptive array antenna system according to the embodiment of the present invention.

FIG. 1 uses reference numerals beginning with 1, FIG. 2 uses reference numerals beginning with 2, and so on.

FIG. 1 shows an adaptive array antenna system 100 according to an embodiment of the present invention. The adaptive array antenna system 100 can be used in a receiver such as a mobile radio or mobile phone. In general the adaptive array antenna system 100 comprises an array antenna 102, an analog-to-digital converter 104 coupled to an output of the array antenna 102, and an adaptive array antenna controller 106 coupled to an output of the analog-to-digital converter 104.

The array antenna 102 according to this embodiment comprises one powered antenna element 108 and a plurality of unpowered antenna elements 110. The powered antennal element 108 is coupled to a front end device 112 that performs band-pass limitation and frequency conversion and others. An output of the front end device 112 forms an output of the array antenna 102 and is connected to the analog-to-digital converter 104. Each of the unpowered antenna elements 110 is connected to the earth potential via a reactance element 111 controlled by the adaptive array antenna controller 106. The powered antenna elements 108 and the unpowered antenna elements 110 electromagnetically interact with each other and form a spatial combination type of array antenna that can change its directivity depending on spatial relations among the antenna elements and impedances of the reactance elements 111.

The adaptive array antenna controller 106 comprises an impulse response measuring device 114 that is coupled to an output of the analog-to-digital converter 104. The impulse response measuring device 114 measures impulse responses by calculating correlation between the output signal from the analog-to-digital converter 104 and a known signal d. More specifically, a preamble signal periodically included in the signal received at the antenna element 108 is inputted to the impulse response measuring device 114. A signal pattern d included in the preamble signal is known to both transmitting and receiving sides. The known signal pattern d is stored in the receiver. The measured impulse responses are inputted to an impulse response generator 116. The impulse response generator 116, based on the measured impulse responses, generates desired impulse responses as explained below. An output of the impulse response generator 116 is connected to a reference signal generator 118. The reference signal generator 118, based on the desired impulse responses and the known signal d, generates a reference signal as explained below. This reference signal and the digital signal from the analog-to-digital converter 104 are inputted to an adaptive controller 120 that adaptively controls a weighting coefficient of each antenna element (a control value for adjusting the impedances of reactance elements 111).

The adaptive controller 120 comprises a correlator 122 that calculates correlation of the reference signal from the reference signal generator 118 and the digital signal from the analog-to-digital converter 104. The correlation values play a role as an evaluation function when adaptively controlling. An output of the correlator 122 is connected to a gradient calculator 124 that calculates each component of a gradient vector for the correlation values. An output of the gradient calculator 124 is connected to an adjustor 126 that adjusts the impedances of the reactance elements. The adjustor 126 comprises a first adjustor 128 and a second adjustor 130. The first adjustor 128 minimally changes the weighting coefficient of each antenna element, and is utilized for perturbation calculation, as explained below. The second adjustor 130 is used for renewing the weighting coefficients to values determined by the perturbation calculation. Digital signals from the adjustor 126 are converted to analog signals by analog-to-digital converters 132, and then supplied to each reactance element 111. By properly adjusting the weighing coefficient of each antenna element, it is possible to control the directivity of the array antenna by steering a beam to a desired wave (leading wave) or steering a null to a delayed wave.

Figure 3:
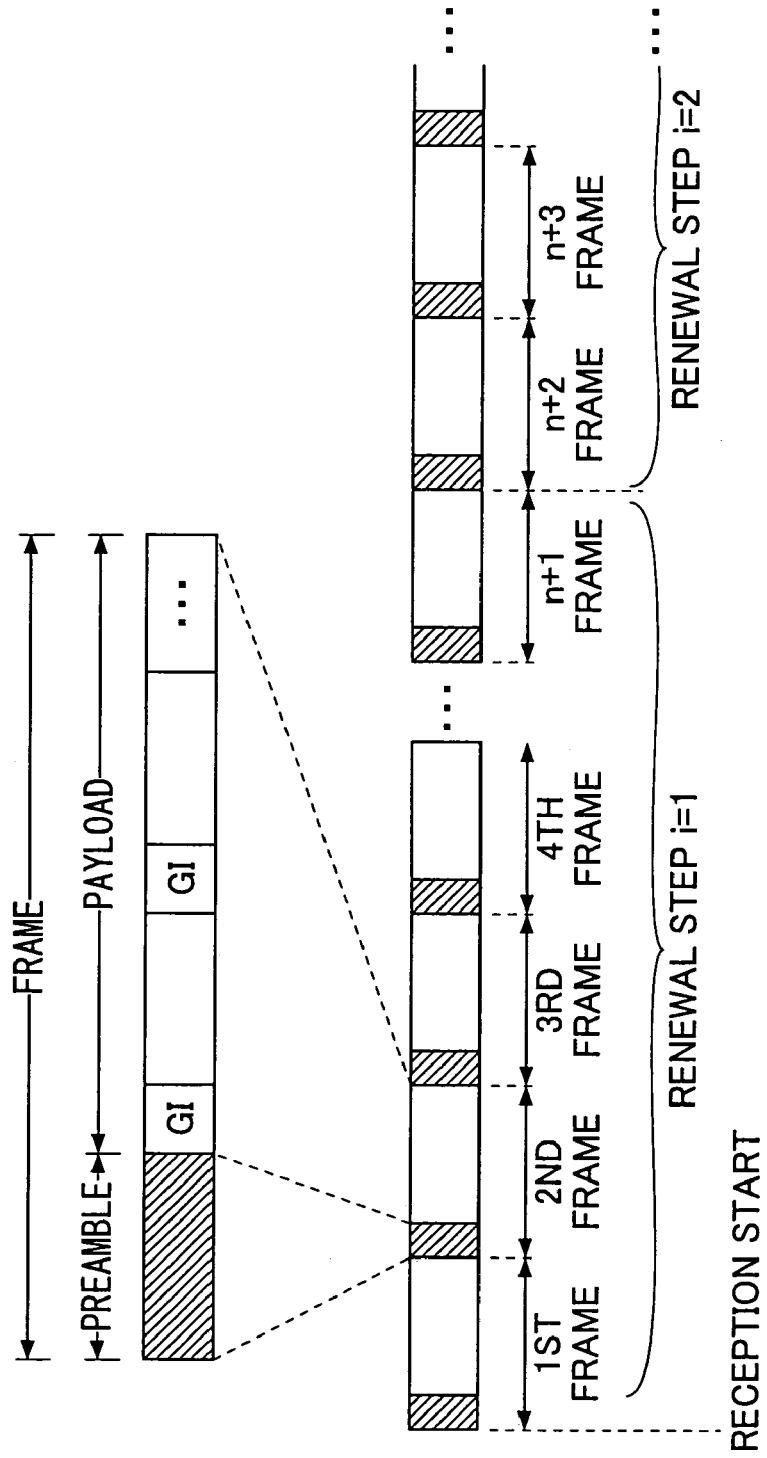
FIG. 3 shows a data diagram of an OFDM signal used in the embodiment of the present invention.

FIG. 2 shows a flow chart illustrating a controlling process performed in the adaptive array antenna system 100 shown in FIG. 1 according to the embodiment of the present invention. At step 202, the system is initialized. Specifically, a renewal step number i of the weighting coefficients, a frame number n and an identification number m for M antenna elements are set to 1. An appropriate bias voltage (or controlling signals for such bias voltages) $v^0=(v^0_1, v^0_2, \ldots, v^0_M)$ is respectively given to each reactance element 111 so that a non-directional beam pattern is formed by the interaction between the powered antenna element 108 and M unpowered antenna elements 111. In other words, the weighting coefficient of each antenna element is adjusted so as to form a non-directional beam pattern. The adaptive array system may receive an OFDM signal, one frame of which includes a preamble and a following payload as shown in FIG. 3. The preamble contains the known signal d having the pattern known to the transmitting and receiving sides.

At step 204 shown in FIG. 2, a signal received at the antenna 108 is processed by the front end device 112 and the analog-to-digital converter 104 to measure a preamble signal $y_{pre}^1$ existing in the first frame in the digital signal.

At step 206, this preamble signal $y_{pre}^1$ and the known signal d are correlated based on the following equation to measure impulse responses $h_0^1(k)$ in the first frame.

$$h_0^1(k) = \sum_{j=0}^{NP-1} d*(j) y_{pre}^1(j+k)$$

$$k = 0, 1, \ldots, NP-1$$

herein k is an integer from 0 to NP−1; NP means the total sampling number of the preamble signal length; and * indicates a complex conjugate.

At step 208, desired impulse responses $h^1(k)$ are generated from the measured impulse responses $h_0^1(k)$.

Figure 4:
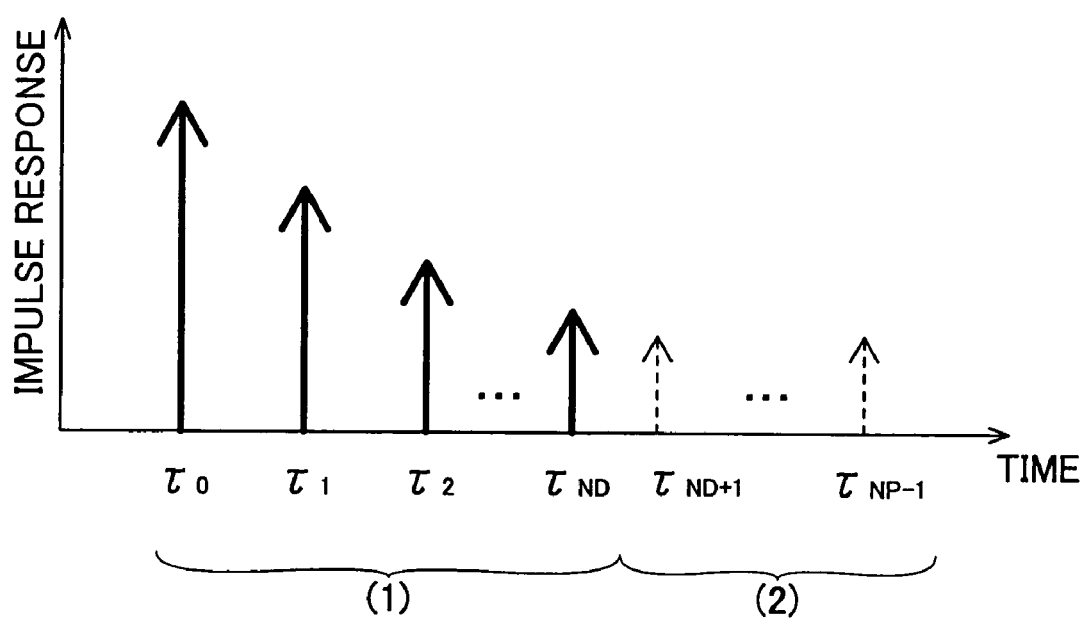
FIG. 4 shows a graph of impulse responses.

A method of generating the desired impulse responses $h^1(k)$ is explained with reference to FIG. 4. FIG. 4 shows a schematic diagram of impulse responses obtained by calculating correlation of the known signal d and the sample $y_{pre}^1$ given by sampling the preamble signal received in the nth frame. The horizontal axis is a time axis and a leading wave $\tau_0$ and following delayed waves (path components) $\tau_1$ to $\tau_{NP-1}$ are shown. The desired impulse responses are generated so as to eliminate delayed waves arriving after a predetermined delay time from the leading wave.

For example, assuming that a period from $\tau_0$ to $\tau_{ND}$ corresponds to a guard interval, path components after $\tau_{ND}$ represent delayed waves arriving after delays over the guard interval. Accordingly, impulse responses that eliminate the path components (2) after $\tau_{ND}$ and relate only to path components (1) from $\tau_0$ to $\tau_{ND}$, represent the ideal impulse responses that would be obtained by adjusting the directivity of the array antenna so as to suppress delayed waves over the guard interval and receive delayed waves within the guard interval. More specifically, the desired impulse responses $h''(k)$ for the nth frame are equal to the measured responses $h_0''(k)$ for k=0, 1, . . . , ND, and equal to zero for k=N, D+1, . . . , NP−1. A value of ND can be adjusted so as to correspond to any desired time period not only to OFDM symbol guard intervals. For example, the ND value can be changed depending on modulation method, and it is possible to narrow the 64QAM time period requiring higher S/N ratio than the 16QAM method.

And then, a reference signal r(k) is calculated by the following equation.

$$r(k) = \sum_{j=0}^{NP-1} h^1(j)d(j+k)$$

$$k = 0, 1, \ldots, ND$$

herein k is an integer from 0 to NP−1; NP means a total sampling number; and * means a complex conjugate. That is, the reference signal r(k) represents an ideal signal that would be obtained when the known signal d is obtained under the influence of ideal impulse responses (transfer function).

Step 210 calculates a correlation value $\rho^1$ of the received-preamble signal $y_{pre}$ (the first frame preamble signal $y_{pre}^1$ at this stage) and the reference signal r(k). The correlation calculation is performed in the correlator 122. In general, a correlation value of the nth frame preamble signal and the reference signal is calculated by the following equation.

$$\rho^n = |y_{pre}^{n*} \cdot r|$$

Next, perturbation procedure 211 is performed for each renewal step in order to successively renew the bias voltage (weighting coefficient) of each reactance element 111.

At step 212, a minimal change is given to the bias voltage of the mth reactance element. At present, a minimal change is given to the bias voltage of the first reactance element (m=1) in the first renewal step (i=1). That is $$v_1^1 = v_1^1 + \Delta v$$

The bias voltages of the reactance elements can be minimally changed by the first adjustor 128. As a result, the directivity of the array antenna is changed.

Steps 214, 216 wait for the next frame preamble signal. At present, the 2nd frame preamble signal $y_{pre}^2$ is awaited (n=2).

Step 218 calculates a correlation value $\rho^2$ of a newly received preamble signal $y_{pre}^2$ at the array antenna after changing its directivity and the reference signal r(k). This correlation calculation is performed also in the correlator 122.

At step 220, based on a difference between the correlation value $\rho^1$ calculated in the previous step 210 and the correlation value $\rho^2$ calculated at the present step 218, the first component of a gradient of the correlation values is calculated. That is, the gradient is obtained based on the correlation values before and after minimally changing the bias voltage (weighting coefficient). Each component of the gradient vector $\nabla\rho$ of the correlation values is calculated by the gradient calculator 124. For example, $$(\nabla\rho)_1 = \Delta\rho/\Delta v = (\rho^2 - \rho^1)/\Delta v.$$

Other components are similarly obtained by the following equation.

$$(\nabla\rho)_j = \Delta\rho/\Delta v = (\rho^{j+1} - \rho^j)/\Delta v.$$

Herein (i=1, 2, . . . , M)

At step 222, the minimally changed bias $v_1^1$ is changed back to the original bias voltage. Therefore, the directivity of the array antenna changed at step 212 is returned to the original directivity.

At step 224, in order to change the bias voltage of the next reactance element, the reactance element identification number m is incremented by 1.

Step 226 determined whether all the M reactance elements are minimally changed in those bias voltages to calculate all the M components of the gradient vector. If the answer is NO, then the process goes back to step 212. The next reactance element is minimally changed in its bias voltage ($v_2^1 = v_2^1 +$ $\Delta v$). A known signal $y_{pre}^3$ in the next frame is measured, and a correlation value $\rho^3$ is calculated. Based on a difference between the correlations $\rho^3 - \rho^2$, the second component of the gradient vector is calculated and then the minimally changed bias voltage is changed back to the original voltage. Similar procedures are repeated on all the reactance elements.

If the answer at step 226 is YES, the process goes forward to step 228, where the bias voltages of all the reactance elements are renewed by the following equation.

$$v^{i+1} = v^i + \mu\nabla\rho$$

Herein, a parameter i means a renewal step number, and equals to 1 at present, and a parameter μ means a renewal step size and equals to 1 at present. The bias voltages are renewed by the second adjustor 130.

At step 230, in preparation for the next renewal step, parameters such as the renewal step number i, the frame number n are incremented and the reactance element identification number m is turned back to 1.

At step 232, the next preamble signal $y_{pre}$ is measured, and the process goes back to step 210 for calculating correlation values. In a similar manner, the weighting coefficients are renewed.

The correlation value ρ is a multi-variable scalar function that varies depending on M bias voltages ($v_1, v_2, \ldots, v_M$). The gradient vector $\nabla\rho$ means the direction which gives the sharpest change in the bias voltages on a curved surface represented by the correlation values ρ. Therefore, going along the gradient vector $\nabla\rho$ results in reaching the minimum value or the maximum value of the correlation values ρ the fastest. Since the correlation values ρ calculated at steps 210, 218 means exactly how much the preamble signal $y_{pre}$ corresponds to the reference signal r, the bias voltages are renewed so as to make the correlation value ρ large.

FIG. 3 shows a schematic diagram of an OFDM signal used in the embodiment of the present invention. As explained above, the adaptive array antenna system according to the embodiment of the present invention successively receives signals, one frame of which comprises one preamble and following payloads. At the time of "RECEPTION START" shown at the left side of FIG. 3, the preamble signal is received and step 204 is performed. The initialization step 202 should be accomplished before receiving the first frame. Until the first frame is finished, preamble signal $y_{pre}$ measurement (step 204), impulse responses measurement (step 206), desired impulse responses and reference signal generation (step 208), correlation value calculation (step 210), and bias voltage adjustment (step 212) are carried out.

In the second frame, preamble signal $y_{pre}$ measurement (step 216), correlation value calculation (step 218), gradient calculation (step 220), bias voltage adjustment (step 222), element number determination (steps 224, 226), and bias voltage adjustment (step 212) are carried out. In a similar manner, the process from step 216 to step 226 and step 212 is repeated for each frame until m=M+1. In the M+1 frame, bias voltage is renewed (step 228).

In the next renewal process beginning from M+2 frame, preamble signal $y_{pre}$ measurement (step 232), correlation value calculation (step 210), and bias voltage adjustment (step 212) are performed. From the M+3 frame, the process from step 216 to step 226 and step 212 is repeated, and the similar processes follow. Therefore, it takes a length of M+1 frame time (M=the number of antenna elements to be adjusted) to renew the weighting coefficients one time.

Figure 5:
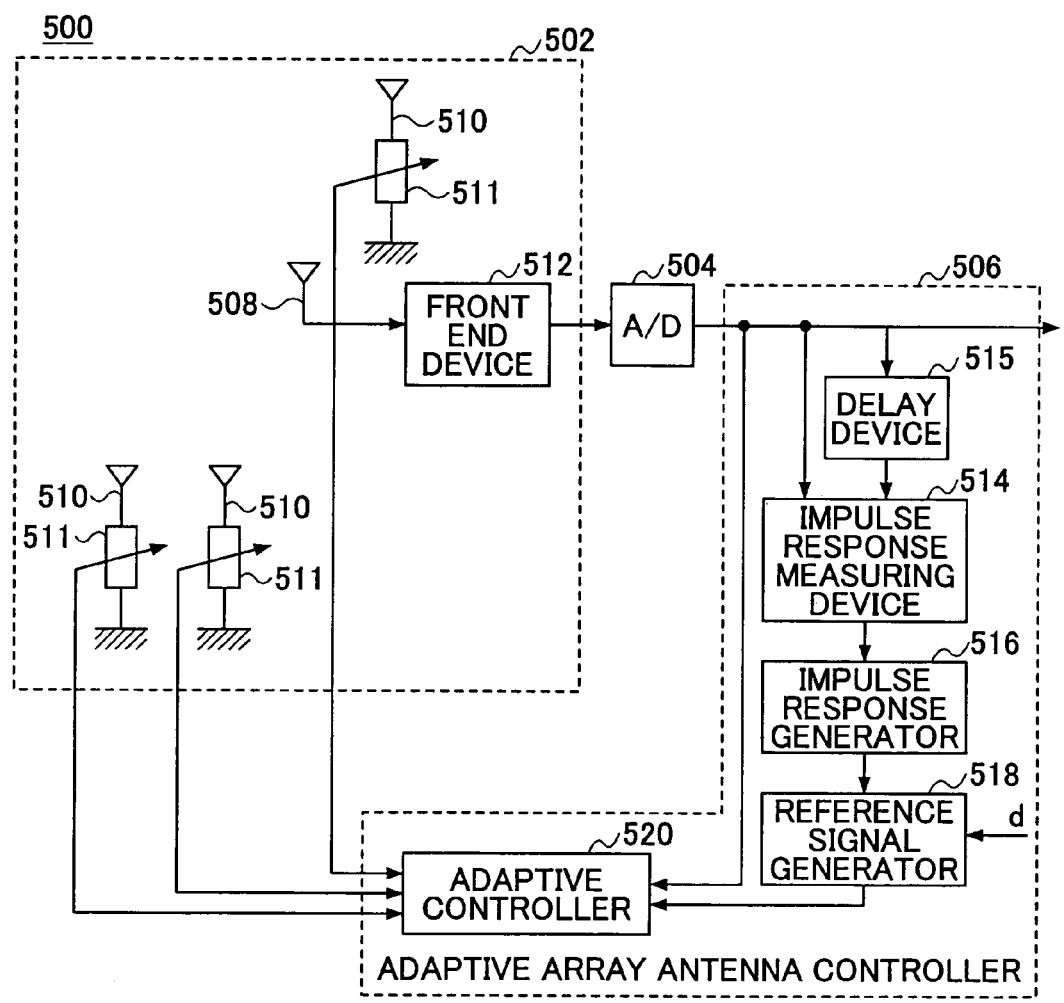
FIG. 5 shows a block diagram of an adaptive array antenna system according to another embodiment of the present invention.

FIG. 5 shows a block diagram of an adaptive array antenna system according to another embodiment of the present invention. In general the adaptive array antenna system 500 comprises an array antenna 502, and an analog-to-digital converter 504 coupled to an output of the array antenna 502, and an adaptive array antenna controller 506 coupled to an output of the analog-to-digital converter 504. The array antenna 502 comprises one powered antenna element 508 and a plurality of unpowered antenna elements 510. The powered antennal element 508 is coupled to a front end device 512 that performs band-pass limitation and frequency conversion and others. An output of the front end device 512 forms an output of the array antenna 502 and is connected to the analog-to-digital converter 504. Each of the unpowered antenna elements 510 is connected to the earth potential via a reactance element 511 controlled by the adaptive array antenna controller 506. The powered antenna element 508 and the unpowered antenna elements 510 electromagnetically interact with each other and form a spatial combination type of array antenna that can change its directivity depending on spatial relations among the antenna elements and impedances of the reactance elements 511.

The adaptive array antenna controller 506 comprises an impulse response measuring device 514 and a delay device 515 that are coupled to the output of the analog-to-digital converter 504. The delay device 514 delays the signal output from the analog-to-digital converter 504 for a predetermined delay time and supplies the delayed signal to the impulse response measuring device 514. The impulse response measuring device 514 calculates correlation of the signal from the analog-to-digital converter 504 and the delayed signal from the delay device 515 to measure impulse responses. The delay time in the delay device 515 equals the inverse $(1/f_0)$ of frequency interval $f_0$ between sub-carriers used in OFDM signals.

Figure 6:
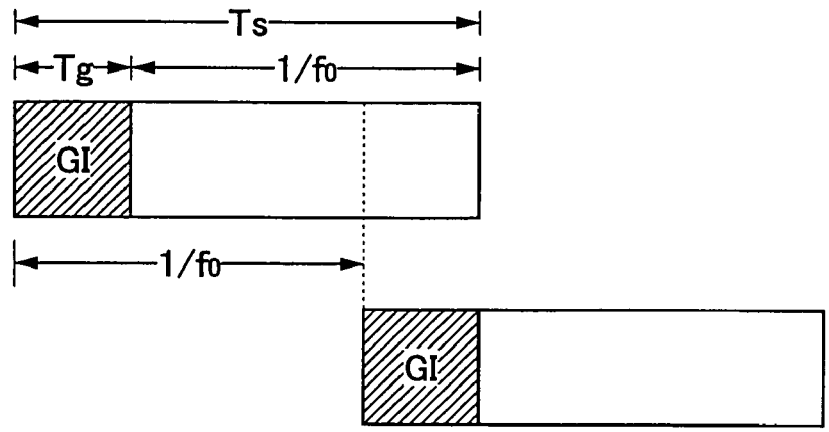
FIG. 6 shows a schematic diagram of an OFDM signal used in the other embodiment of the present invention.

FIG. 6 shows a timing relation between the digital signal inputted to the impulse response measuring device 514 and its delayed signal. One symbol has a total time period $T_s$, which includes a guard interval time $T_g$ and effective symbols occupying $1/f_0$ length. As shown in FIG. 6, the lower signal is delayed for a period $1/f_0$. The end portion in the effective symbols $(1/f_0)$ is copied onto the guard interval. Therefore, calculating correlation of one signal and another signal delayed for $1/f_0$ means self correlation calculation for the guard interval portion, and the result shows an impulse response.

With reference to FIG. 5 again, thus measured impulse responses are inputted to an impulse response generator 516 to generate desired impulse responses as explained above. The impulse response generator 116, based on the measured impulse responses, generates desired impulse responses as explained below. An output of the impulse response generator 516 is connected to a reference signal generator 518. The reference signal generator 518, based on the desired impulse responses and the known signal d, generates a reference signal. This reference signal and the digital signal from the analog-to-digital converter 504 are inputted to an adaptive controller 520 that adaptively controls a weighting coefficient of each antenna element. The adaptive controller 520 adjusts the weighting coefficient of each antenna element in the same manner as explained above.

According to this embodiment, no known signal such as preamble signal $y_{pre}$ is needed to measure the impulse responses and generate the reference signal, and calculation can be easily done based on the self correlation from the payload portions of the analog-to-digital converter 104.

In the above embodiments, the array antennas 102, 502 employ a spatial processing type, but may employ other types of antenna systems.

Figure 7:
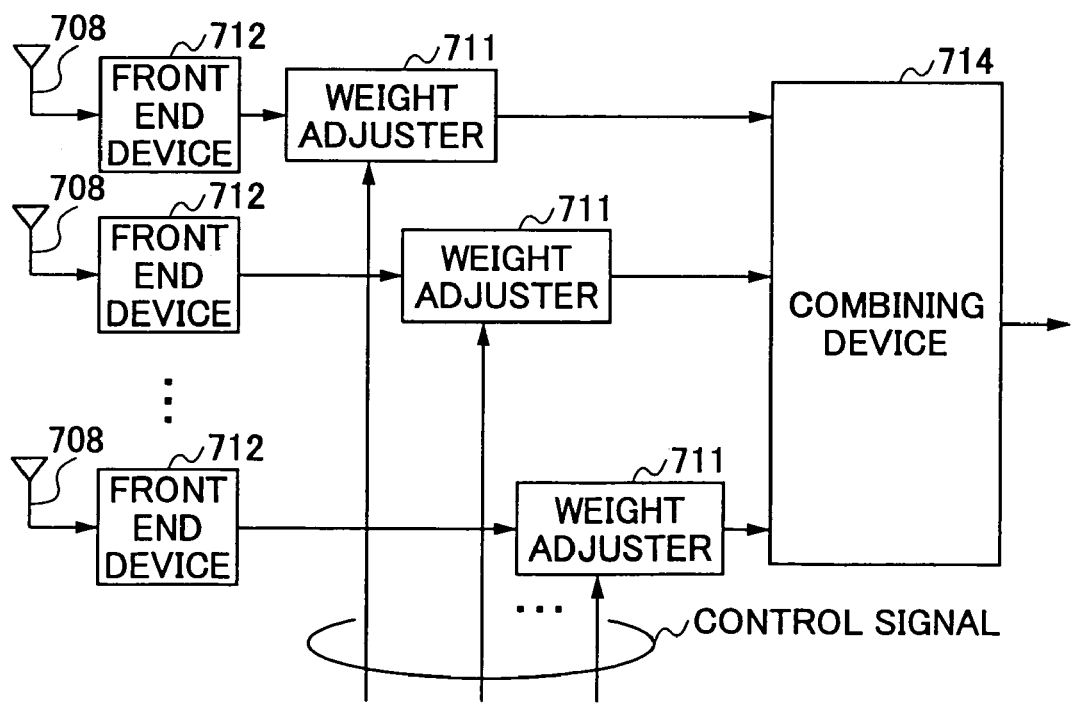
FIG. 7 shows a block diagram of an adaptive array antenna system according to yet another embodiment of the present invention.

FIG. 7 shows an RF processing type system (or phased array system) as one example of another type of antenna system. As shown, each of a plurality of antenna elements 708 is provided with a front end device 712. An output of each front end device 712 is connected to a weight adjustor 711 that adjusts an amplitude and phase of a received signal. Outputs of the weight adjustors 711 are all connected to a combining device 714 that outputs a weighted and combined analog signal. This analog signal is inputted to the following analog-to-digital converter 104 (not shown). The adjustments of the amplitudes and phases in the weight adjustors 711 are performed based on control signals from the adaptive array controller 106 (not shown).

In the spatial processing type systems shown in FIG. 1 and the RF processing type system shown in FIG. 7, the weighted and combined analog signal is converted by one analog-to-digital converter to form a signal supplied to a digital processing part (following the demodulation circuit and adaptive array antenna controller), and therefore advantages are gained from the viewpoints of power consumption, circuit size and cost. The RF processing type system shown in FIG. 7 can adjust amplitude and phase independently, and the largest ratio combination is possible in the combining device 714, and therefore it is advantageous in performing highly accurate control, compared with the FIG. 1 system. The spatial processing system shown in FIG. 1 controls reactance elements only and is advantageous in constructing a simple system, compared with the FIG. 7 system, which has to separately control a reactance element and a capacitance element for each antenna element.

In the above explained embodiments, path components (indicated by (1) in FIG. 4) included within a predetermined time from the leading wave are extracted from the all path components included in the impulse responses, in order to generate desired impulse responses and a reference signal and calculate a correlation value to be made larger. However, the present invention is not limited to this. For example, it is possible to eliminate path components ((1) in FIG. 4). within a predetermined time from the leading wave and extract the remaining path components ((2) in FIG. 4) after the predetermined time, to generate impulse responses. A reference signal r obtained by making convolution calculation of thus generated impulse responses and a known signal d, results in signals being obtained by only receiving delay signals arriving after the predetermined time. Therefore, in this case the weighting coefficients can be controlled so as to make correlation of the reference signal and preamble signal zero, so as to exclude the delayed signals arriving after the predetermined time.

Some delayed waves (even within a desired time duration) having signal levels greater than necessary, may decrease a DU ratio (Desired to Undesired Ratio, Power of leading wave/Average Power of delayed waves) and degrade a symbol-to-error ratio. Accordingly it is advantageous to exclude path components having levels grater than a predetermined level at impulse response generators 116, 516.

Figure 8:
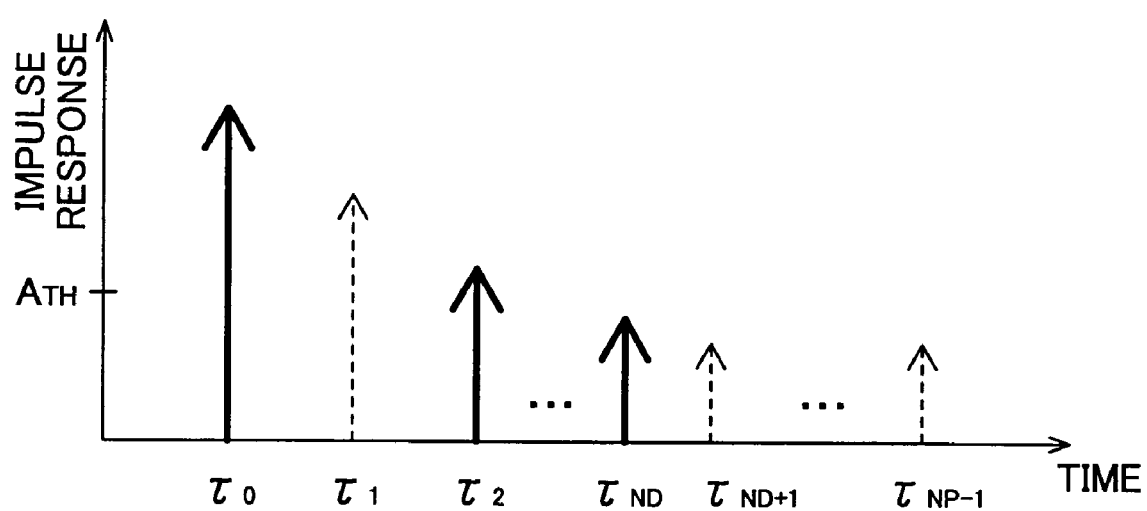
FIG. 8 shows a graph of impulse responses according to the present invention.

In an example shown in FIG. 8, not only delayed path components. $\tau_{ND+1}$ to $\tau_{NP-1}$ but also a path component $\tau_1$ exceeding a predetermined threshold $A_{TH}$ is excluded. The thus generated convolution calculation of the impulse responses and the known signal d produces the ideal received signal that would be received with path components $\tau_1$ and $\tau_{ND+1}$ and after being suppressed. Therefore, by adjusting the weighting coefficients so as to make the actual received signal close to the reference signal, it becomes possible to form a beam pattern that could suppress delayed waves and suppress waves decreasing the DU ratio.

As explained above, adaptive controllers according to the embodiments for controlling spatial processing types or RF processing types of array antennas can adaptively control the weighting coefficients of the array antenna and can suppress path components arriving after a certain delay, while reducing power consumption.

In the embodiments of the present invention, before starting the weighting coefficient renewing process (step 210 and after), an array antenna 102 is adjusted to be non-directional, impulse responses are measured (step 204), desired impulse responses are generated (step 206) and a reference signal is generated (step 208). Therefore, it is possible to accurately detect the strengths and directions of the leading wave and delayed waves, to properly determine path components to be suppressed, and to direct the antenna beam to a desired wave or directing the null to a delayed wave.

Further, it is also advantageous to regularly or when desired, make the array antenna non-directional and performs steps after the initialization step 202 shown in FIG. 2, because the communication environment of mobile communication systems is continuously changing as time goes by. As the communication environment changes, impulse responses (on which desired impulse responses and a reference signal are based) change. Accordingly it is desired to appropriately change impulse responses together with the change in the communication environment.

For example, there is a tendency for weighting coefficients to be converged into one value to provide a stronger directional antenna pattern, as the renewal step number increases. However, in a case where weighting coefficient variation between before and after renewal is excessively large, there is a high probability for a desired wave direction or an undesired wave direction to be changed due to the change in communication environment. Accordingly, when the weighting coefficient variation is larger than a predetermined value, it is advantageous to assume communication environmental changes and to adjust the array antenna to be non-directional.

When the communication environment changes, the direction or time delay of a desired or undesired wave is most likely to be changed. In this case, when path component variation becomes larger than a predetermined value, it is advantageous to assume communication environmental changes and to adjust the array antenna to be non-directional.

According to the embodiments of the present invention, it is possible to suppress path components received after a delay over a predetermined delay time from a leading wave while reducing power consumption.

Further, the present invention is not limited to these embodiments, but various variations and modifications may be made without departing from the scope of the present invention.

The present application is based on Japanese priority application No. 2002-380640 filed on Dec. 27, 2002 with the Japanese Patent Office, the entire contents of which are hereby incorporated by reference.

What is claimed is:

1. An adaptive array antenna controller that adaptively controls weighting coefficients of a plurality of antenna elements of an array antenna based on a digital signal outputted from an analog-to-digital converter receiving a weighted analog signal received from the array antenna, comprising:
    an impulse response measuring device for obtaining impulse responses, based on correlation calculation of the digital signal and a known signal having a predetermined pattern;
    an impulse response generator for extracting path components existing within a predetermined time duration from among a plurality of path components included in the impulse responses and generating desired impulse responses;
    a reference signal generator for forming a reference signal having a desired pattern, based on convolution calculation of the desired impulse responses and the known signal; and
    an adaptive controller for adjusting the weighting coefficients, based on the digital signal and the reference signal.

2. The adaptive array antenna controller as claimed in claim 1, wherein the adaptive array antenna controller receives a combined weighted analog signal received from the array antenna combining the received signals from said antenna elements.

3. The adaptive array antenna controller as claimed in claim 1, wherein the adaptive array antenna controller receives the weighted analog signal received from the array antenna comprising a plurality of unpowered antenna elements and one powered antenna element.

4. The adaptive array antenna controller as claimed in claim 1, wherein
    the impulse response generator generates the desired impulse responses by extracting path components existing within a predetermined time duration from a leading wave from among the path components included in the impulse responses; and
    the adaptive controller calculates correlation value of the digital signal and the reference signal and adjusts the weighting coefficients so as to make the correlation value large.

5. The adaptive array antenna controller as claimed in claim 1, wherein
    the impulse response generator generates the desired impulse responses by extracting path components existing outside a predetermined time duration from a leading wave from among the path components included in the impulse responses; and
    the adaptive controller calculates correlation value of the digital signal and the reference signal and adjusts the weighting coefficients so as to make the correlation value small.

6. The adaptive array antenna controller as claimed in claim 1, wherein the digital signal comprises a preamble part and a payload part, and the impulse response measuring device obtains the impulse responses by utilizing a signal contained in the preamble part.

7. The adaptive array antenna controller as claimed in claim 1, wherein the digital signal comprises a preamble part and a payload part, and the impulse response measuring device obtains the impulse responses by utilizing a signal contained in the payload part.

8. The adaptive array antenna controller as claimed in claim 1, further comprising:
    a delay device, an input of which is connected to the output of the analog-to-digital converter, for delaying the input signal for a predetermined delay time;
    wherein the impulse response measuring device is connected to the output of the analog-to-digital converter and the output of the delay device, and
    the predetermined delay time equals to a difference obtained by subtracting a guard interval length from one symbol length of a plurality of OFDM symbols forming the payloads.

9. The adaptive array antenna controller as claimed in claim 1, wherein the adaptive controller further comprises:

a correlator for calculating a correlation value of the digital signal and the reference signal;

an adjuster for changing the weighting coefficients of the antenna elements; and a gradient calculator for calculating a gradient, based on the correlation values before and after changing the weighting coefficients;

whereby the weighting coefficients are renewed based on the gradient of the correlation values.

10. The adaptive array antenna controller as claimed in claim 1, wherein the impulse responses, the desired impulse responses and the reference signal are generated based on the digital signal obtained when the array antenna forms a non-directional antenna pattern.

11. The adaptive array antenna controller as claimed in claim 10, wherein the impulse responses, the desired impulse responses and the reference signal are generated when an impulse response variation obtained by the impulse response measuring device becomes larger than a predetermined threshold.

12. The adaptive array antenna controller as claimed in claim 10, wherein the impulse responses, the desired impulse responses and the reference signal are generated when a variation in the weighting coefficients renewed successively becomes larger than a predetermined threshold.

13. The adaptive array antenna controller as claimed in claim 1, wherein the impulse response generator generates the desired impulse responses so as to eliminate every path component included in the impulse responses that exceeds a predetermined signal level except a leading wave component.

* * * * *